Figure 1:
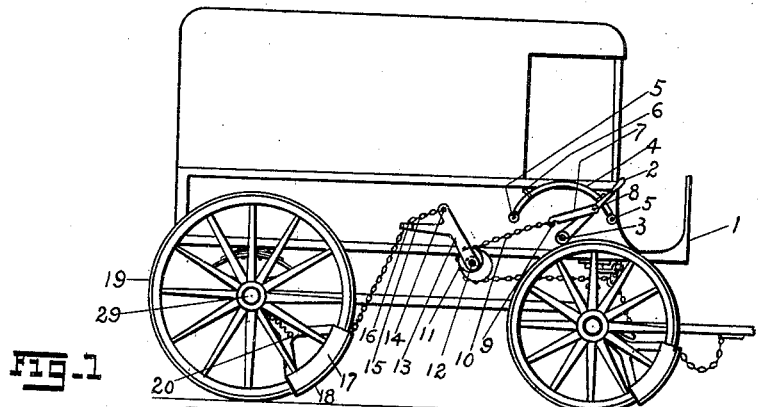

A. HOFACKER.
SLEIGH ATTACHMENT FOR VEHICLES.
APPLICATION FILED NOV. 10, 1913.

1,103,415.

Patented July 14, 1914.

WITNESSES:
Henry Motz
Ernst Henry

INVENTOR
Anton Hofacker

UNITED STATES PATENT OFFICE.

ANTON HOFACKER, OF NEWARK, NEW JERSEY.

SLEIGH ATTACHMENT FOR VEHICLES.

1,103,415.  Specification of Letters Patent.  Patented July 14, 1914.

Application filed November 10, 1913. Serial No. 800,170.

*To all whom it may concern:*

Be it known that I, ANTON HOFACKER, a citizen of the United States, residing at Newark, in the county of Essex and State of New Jersey, have invented certain new and useful Improvements in Sleigh Attachments for Vehicles; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in sleigh-attachments for wheeled vehicles; and, the present invention relates, more particularly, to a novel attachment for wheeled vehicles of the various kinds, which can by the simple movement of a lever, operated by a person seated in the vehicle be brought into its proper relation with the wheels, so as to turn the vehicle into a sleigh.

The principal object of the present invention, therefore, is to provide a simply constructed, as well as a quickly and readily manipulated sleigh or runner attachment that can readily be attached on any two or four wheeled vehicle from a boy's play wagon or a baby carriage to a four horse truck, also suitable for attaching to the front wheels of automobiles; and, furthermore permitting interchangeable shoes on the runners which can be easily and quickly attached to the same.

The invention has for its further object to provide an attachment for the wheels of vehicles which, while it is primarily intended for the use as a runner or sleigh-attachment, may also be used as a wagon-brake or drag for controlling the momentum of the vehicle in descending hills and steep inclines.

Other objects of this invention not at this time more particularly enumerated will be clearly understood from the following detailed description of the present invention.
With the various objects of this invention in view, the said invention consists, primarily, in the novel arrangements and combinations of the devices and parts, as well as in the details of the construction of the said parts, as described in detail in the following specification, and then finally embodied in the clauses of the claim which are appended to and which form an essential part of this specification.

The invention is clearly illustrated in the accompanying drawings, in which:—

Figure 2:
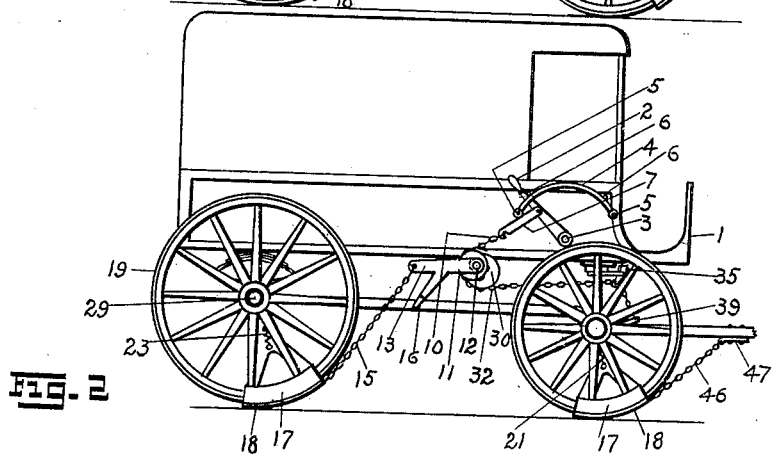
Figures 4, 5:
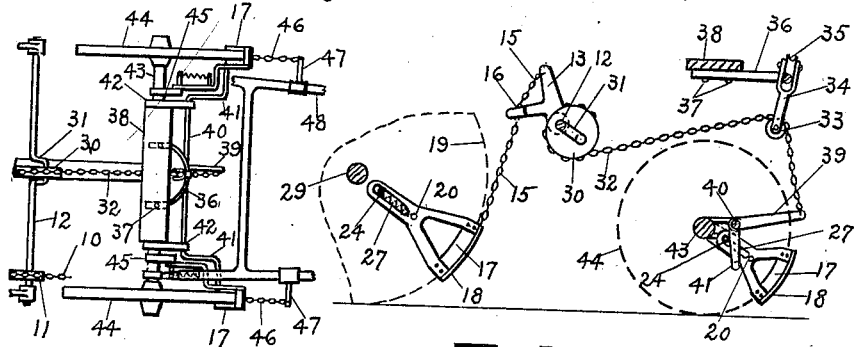
Figure 6:
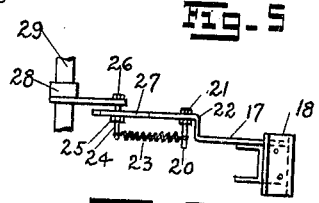
Figure 3:
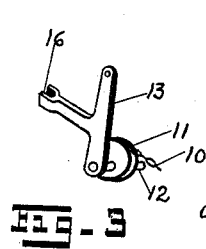

Figure 1 is a side elevation of a vehicle provided with a sleigh-attachment constructed in accordance with the principles of the present invention, the runners being shown in their raised relations with the wheels; Fig. 2 is a similar view of the vehicle, but showing the runners of the sleigh-attachment in their lowered and operative relations with the wheels; Fig. 3 is a view showing the controlling lever of the rear runners, actuating eccentric, and fork for holding and guiding the chain; Fig. 4 is a view of the front running gear showing operation of front runners and their connection with rear runners; Fig. 5 is a sectional view showing the connection of the front runners with the rear runners; and Fig. 6 is a view showing the connection and construction of the rear runners with the rear axle.

Similar characters of reference are employed in all of the above described views, to indicate corresponding parts.

Referring now to said drawings, the reference character 1 indicates a vehicle, 2 is the operating lever which swings on a pivot 3 controlled by the guide 4, attached to the vehicle by the bolts 5 and regulated by the stops 6. Attached to the lever 2 is a hook 7 which swings on a pivot 8, to which link at the hook end 9 is attached a chain 10 which is fastened to the rear shoe eccentric 11; to which is attached the shaft 12 and the rear runner arm 13 having attached at the eye end 14 a chain 15 guided by the fork 16.

Movably arranged upon the peripheral portions of each front wheel 44 and each rear wheel 19, so as not to interfere with the revolving movements of the wheels, is a segmental runner 17, made of metal or any other suitable material, these runners being provided with side flanges which extend partly up the sides of the wheels, while to the runners is attached an interchangeable shoe 18.

A spring stud 20, held by a lock nut 21 is fixed at the angle 22 in the runner 17 which has a slot 27 in which is the stud 24 which acts as a guide and pivot for the runner 17, said stud being fixed to the clamping device 28 which in turn is clamped to the axle 29. The stud 24 is attached to the clamping device 28 by a locknut 26 which has an adjusting nut 25 for regulating the spring 23 connected to the extreme end, the other end of said spring being attached to the stud 20. The function of this spring is to hold the runner when raised in its proper relation with the wheels of the vehicle so as not to interfere with the free revolving movement of the same as shown more particularly in Fig. 6.

From a front eccentric 30 attached to a crank 31 under the bed of the vehicle on the shaft 12 is attached a chain 32 which runs through a pulley 33 and is attached to the lever 39; attached to the other end of the pulley frame 34 is a grooved pulley 35 which runs on a track or running gear 36 fastened with bolts 37 as illustrated in 38 to the bed of the vehicle.

Attached to the front axle 43 and the lever 39 is a shaft with a crank 41 provided with suitable bearings 42, a suitable clamping device 45 holding the stud 24 to the axle 43 substantially as shown and as will be clearly understood from an inspection of Fig. 4 of the drawings.

As shown, the runners upon the front wheels of the vehicle are connected to a chain 46 the other end of said chain being connected by a suitable bracket 47 to the vehicle shaft 48.

When the several parts are in the positions shown in said Fig. 1, the chains 10 and 15 are pulled taut, and the runners are in their raised positions, so that the wheels of the vehicle are free to revolve. When, however, the operating lever is thrown into the position as indicated in Fig. 2 of the drawings, the runners are lowered and the wheels will ride directly upon said runners until the chains 15 and 46 are held taut, thus providing a suitable sleigh-attachment or drag or brake for each wheel which prevents its turning, as will be clearly evident.

It will be understood that the operating lever 2 can be placed on either side of a vehicle, making it easily operative for left or right hand people, and that by omitting the front wheel equipment this attachment can be attached on two as well as four wheeled vehicles.

I am aware, that some changes may be made in the general arrangements and combinations of the devices and parts, as well as in the details of the construction of the same, without departing from the scope of the present invention as set forth in the foregoing specification, and as defined in the claims which are appended thereto. Hence, I do not limit my present invention to the exact arrangements and combinations of the devices and parts as described in the said specification, nor do I confine myself to the exact details of the construction of the said parts as illustrated in the accompanying drawings.

I claim:—

1. In a sleigh attachment for wheeled vehicles, the combination with the body and wheels of the vehicle, of a cross shaft under the body of the vehicle, having attached thereto levers and forked arms, said levers and arms flexibly connected with pivoted segmental runners, a handle mounted on the side of the vehicle, flexibly connected with the said cross shaft, substantially as and for the purpose set forth.

2. In a sleigh attachment for wheeled vehicles, the combination with the body and wheels of the vehicle, of a cross shaft under the body, bearings for said shaft fixed to the body, levers and forked guide arms attached to the cross shaft and flexibly connected to pivoted segmental runners, a handle mounted on the side of the vehicle, a handle guiding and locking device secured upon the side of the vehicle, substantially as and for the purpose set forth.

3. In a sleigh attachment for wheeled vehicles, the combination with the body and wheels of the vehicle, of a cross shaft under the body, bearings for said shaft fixed to the body, levers and forked guide arms attached to the cross shaft and flexibly connected to pivoted radially sliding, spring controlled segmental runners with guide flanges, a handle mounted on the side of the vehicle, a guiding and locking device secured to the side of the vehicle, substantially as and for the purpose set forth.

4. In a sleigh attachment for wheeled vehicles, the combination with the body and wheels of the vehicle of a cross shaft under the body, bearings for said shaft fixed to the body, levers and forked guide arms attached to the cross shaft and flexibly connected to pivoted radially sliding, spring controlled segmental runners with guide flanges and detachable shoes, said pivoted runners attached to the axle of the vehicle, a handle mounted on the side of the vehicle, a guiding and locking device secured to the side of the vehicle, substantially as and for the purpose set forth.

In testimony, that I claim the invention set forth above I have hereunto set my hand this 7th day of November, 1913.

ANTON HOFACKER.

Witnesses:
HENRY MOLZ,
ERNST HENRY.